March 9, 1954 — L. E. BALDWIN — 2,671,463
FLUID PRESSURE REGULATOR
Filed Sept. 13, 1948 — 2 Sheets-Sheet 1
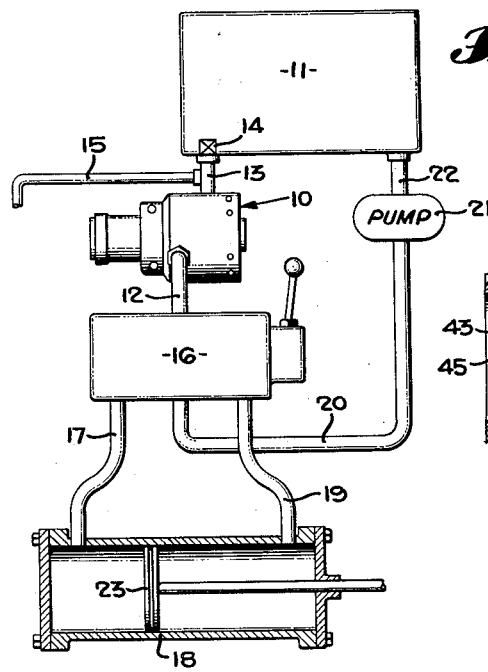
Fig. 1.
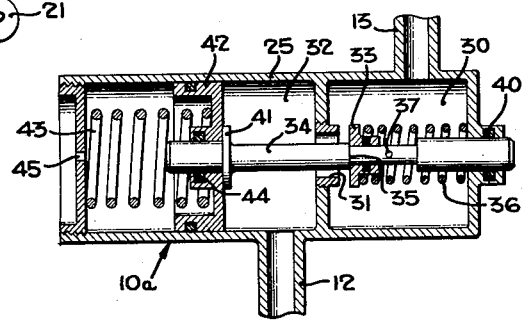
Fig. 2.
Fig. 3.
Fig. 4.
LEE E. BALDWIN,
INVENTOR.
BY Robert J. Fulwider
ATTORNEY March 9, 1954     L. E. BALDWIN     2,671,463
FLUID PRESSURE REGULATOR
Filed Sept. 13, 1948     2 Sheets-Sheet 2
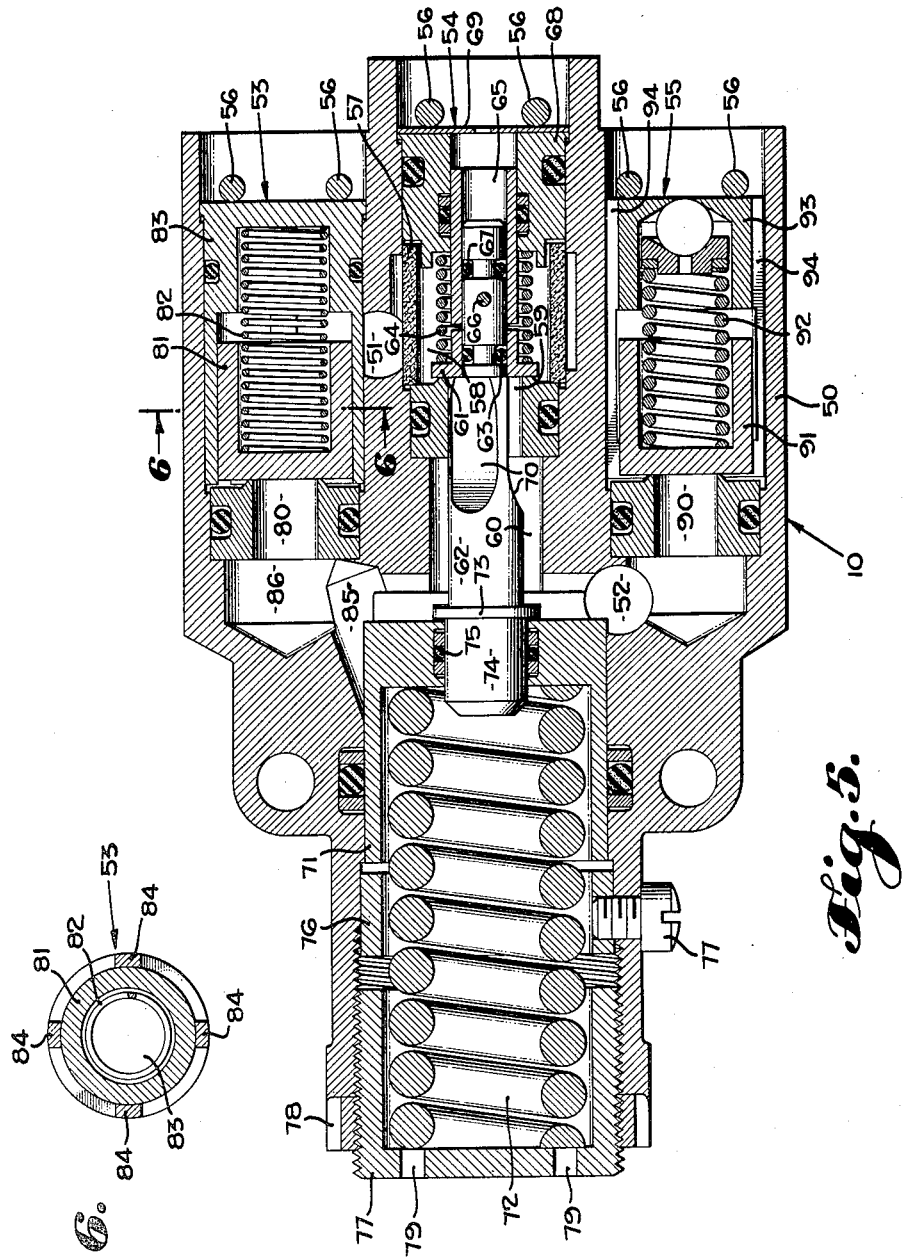
Lee E. Baldwin,
INVENTOR.
BY
Robert O. Fulwider
ATTORNEY Patented Mar. 9, 1954

2,671,463

UNITED STATES PATENT OFFICE 2,671,463

FLUID PRESSURE REGULATOR

Lee E. Baldwin, Glendale, Calif., assignor to Weston Hydraulics, Limited, North Hollywood, Calif., a corporation of California Application September 13, 1948, Serial No. 49,111

11 Claims. (Cl. 137—102)

This invention relates generally to fluid pressure regulators, and more particularly, to a pressure reducing valve for use in fluid pressure actuated remote control systems.

In servo systems involving fluid pressure operated devices, such for example, as the control systems in aircraft, it is frequently the practice to provide a supply reservoir of the actuating fluid, e. g., air or liquid, which is maintained at a pressure considerably higher than the operating pressure. Such high pressure storage reservoir is maintained at a pressure which may vary somewhat but is normally always greater than the operating pressure. It is accordingly necessary to provide a regulator or pressure reducer in the line from the reservoir to the operating control.

Several features are desirable in a pressure reducer for the purpose just stated, which have not always been found in devices heretofore available. Among such desirable features are the following.

First, the pressure reducer should include a valve element which operates extremely rapidly to restore pressure whenever the working pressure drops below a predetermined value. It is also desirable that when the valve operates to admit fluid from the reservoir into the working system that it close quickly when the working pressure has been restored to the desired value, and that oscillatory surges above and below the working pressure be avoided. In previous devices wherein the movable valve element, combined with the pressure sensitive element required to open and close it, is relatively large and massive, the tendency is for the valve to resist opening and closing due to the inherent inertia of the movable element, and due also to the static friction which must be overcome to initially move large members. The result of this is that the working pressure must drop a considerable amount below the normal level before the valve opens appreciably. Furthermore, when the working pressure is restored to normal, the valve does not close immediately, allowing a surge above the normal working pressure and if relief valves or other means are provided to relieve the pressure in the working system, the pressure is again dropped a little below normal, thus producing an oscillatory pressure surge above and below the normal working level. This is an undesirable condition, particularly in aircraft controls where such oscillations may reflect themselves in mechanical movement of control surfaces or other hydraulic or air-actuated parts.

Another desirable feature to be incorporated in high pressure storage systems of the class described involves a return of the actuating fluid from the working system to the reservoir in the event of temporary or permanent loss of reservoir pressure. Such is a particularly valuable feature in air-actuated systems. For example, should the high pressure reservoir be damaged so as to release the fluid stored therein, there still may be sufficient fluid under pressure in some of the actuating cylinders of the working system to actuate others of said cylinders. Thus, if a check valve is employed at the exit of the reservoir so as to entrap all pressurized fluid throughout the system (both high pressure and working), it then is possible by providing a reverse flow check valve in the pressure reducer to permit fluid from some parts of the working system to return to the high pressure system for distribution to other parts of the working system.

Still another desirable feature in systems of the class described is a relief valve to permit release of excess fluid from the working system should the pressure therein, for any reason, exceed the normal working pressure. Such increase may occur, for example, by reason of thermal expansion, or may occur for other reasons.

Bearing in mind the foregoing desirable characteristics, it is a major object of the present invention to provide a pressure reducing valve of the class described having a valving element of extremely low inertia whereby to avoid oscillatory pressure surges as above described.

It is another object of the invention to provide in a valve of the class described, a return check valve by which fluid in the working system may be returned to the high pressure storage system in the event of depletion of the storage reservoir.

Still another object of the invention is to provide in a valve of the class described, a simplified relief valve for relieving excess pressure in the working system.

A further object of the invention is to provide a valve of the class described in which the forces acting on the movable valve element by reason of fluid pressures are substantially balanced out.

A still further object of the invention is to provide a pressure reducing valve as described which is adapted for quantity production and is easily disassembled and reassembled for purposes of maintenance and repair.

The foregoing and other objects and advantages of the invention will become apparent from a consideration of the following detailed description, such consideration being given also to the attached drawings, in which:

Figure 1 is a semi-schematic diagram illustrating the connection of a valve embodying the present invention in an air-actuated control system;

Figures 2 and 3 are axial sections taken through a simplified version of a valve embodying certain features of the present invention and serve as operational diagrams;

Figure 4 is an end elevational view of a presently preferred form of pressure reducing valve embodying the present invention;

Figure 5 is an elevational section taken on the line 5—5 in Figure 4; and

Figure 6 is an elevational partial section taken on the line 6—6 in Figure 5.

In the diagram in Figure 1, the pressure reducing valve embodying the present invention is designated by the reference character 10, and is connected in the system to reduce the relatively high pressure in a storage reservoir 11 to a working pressure delivered through a conduit 12 to the working system. Fluid under relatively high pressure is delivered by a conduit 13 from the storage reservoir 11 to the reducer valve 10. A check valve 14 is provided at the exit of the reservoir 11 to prevent counter-flow of the fluid from the conduit 13 into the reservoir 11 in the event that the reservoir should be damaged to release the fluid and pressure therein. A branch conduit 15 is provided which may lead to a second pressure reducing valve 10 supplying fluid to another portion of the working system.

Fluid delivered by the working pressure conduit 12 is controlled by a four-way control valve 16 of conventional design which is adapted to deliver fluid at working pressure selectively through a conduit 17 to one end of a fluid motor or actuating cylinder 18, through another conduit 19 to the other end of the cylinder 18, or through a conduit 20 to a pump 21 for compression and return to the storage reservoir 11 through a conduit 22.

A piston 23 is moved to the left or right (in Figure 1) depending upon which end of the cylinder 18 receives fluid under the control of the valve 16. Such fluid as is exhausted from the cylinder 18 by reason of movement of the piston 23 is returned through one of the conduits 17 or 19 to the control valve 16 which is adapted to connect one or the other of said conduits 17 and 19 to the return conduit 20.

As previously stated, the storage pressure of the fluid in the reservoir 11 may vary over a considerable range but is always greater than the normal working pressure required for the actuation of the piston 23 in the cylinder 18. Thus, the primary requirement of the valve 10 is that it reduce this indeterminate storage pressure to a fixed and predetermined working pressure.

The basic elements required for this pressure reducing operation are illustrated in the semi-diagrammatic views, Figures 2 and 3. The simplified valve 10a illustrated in Figures 2 and 3 comprises a cylindrical housing 25 enclosed at the left end and provided with fluid connections 12 and 13. In Figures 2 and 3, the working pressure and high pressure connections 12 and 13 are indicated corresponding to the conduits 12 and 13 in Figure 1. From the high pressure conduit 13, fluid under storage pressure enters a chamber 30 from which it may (under certain conditions) flow through a valve port 31 into a working pressure chamber 32, whence it is discharged into the working pressure conduit 12.

A valve member 33 slidably positioned on a valve stem 34 is positioned and adapted to cooperate with the valve port 31 to close the same when the working pressure in the chamber 32 reaches the predetermined normal value. A shoulder 35 is formed in the valve stem 34 and positioned to engage the valve member 33 upon movement of the valve stem 34 to the right and open the valve member 33 as indicated in Figure 2.

Upon movement of the valve stem 34 to the left, the shoulder 35 is pulled away from its engagement with the valve stem 34 permitting a compression spring 36 to close the valve member 33 against the valve port or seat 31. A pin 37 fixed in the valve stem 34 is adapted to engage the valve member 33 to prevent motion of the valve stem 34 substantially greater than that required to close the member 33 against the seat 31.

It should be noted that the valve stem 34 is extended outwardly to the right through the end wall of the housing 25, a fluid seal 40 being provided to prevent escape of fluid from the high pressure chamber 30.

The diameter of that portion of the valve stem 34 which extends to the right and out of the housing 25 is made substantially equal to the diameter of the valve port 31 whereby the force exerted on the valve member 33 due to the fluid pressure in the chamber 30 is substantially balanced out in that the valve stem 34 has a force acting thereon tending to expel the stem through the right-hand end of the housing 25 which is approximately equal to the force exerted on the member 33 due to the attempted escape of fluid through the port 31. In practice, it has been found desirable to make the diameter of the extending valve stem 34 slightly less (at its right-hand end) than the diameter of the port 31, thereby leaving a slight residual force operating in a direction to close the valve member 33.

In order to move the valve stem 34 to the right to open the valve member 33 when the working pressure in the chamber 32 drops below a desired minimum value, a movable piston 42 is slidably mounted in the housing 25 forming the left-hand closure of the working pressure chamber 32. The piston 42 is urged to the right by a calibrated compression spring 43, the rate of the spring 43 being such that when the pressure in the chamber 32 is at the minimum predetermined value, the shoulder 35 is just engaging the valve member 33 in preparation to pushing the same to the right to open the port 31. Motion of the piston 42 is transmitted to the valve stem 34 by engagement of the piston with a flange or shoulder 41 formed near the left end of the valve stem 34.

The valve stem 34 is slidable in the piston 42, a fluid seal 44 being provided to prevent escape of fluid around the stem. The diameter of that portion of the valve stem 34 which extends through the piston 42 is also made substantially equal to the diameter of the port 31 whereby the forces exerted on the valve stem 34 by reason of the working pressure in the chamber 32 are substantially balanced out. In actual practice, the diameter of the valve stem 34 within the piston 42 is made slightly greater than that of the port 31 whereby to again leave a slight residual force tending to hold the valve member 33 in its closed position.

A breather orifice 45 is formed in the left end of the housing 25 in order to permit air to leave or enter the space behind the piston 42 during the movement thereof.

In operation of the valve 10a, high pressure fluid is introduced through the conduit 13 and since initially there is no pressure in the chamber 32 to counteract the force of the calibrated spring 43, the valve stem 34 is in its right-hand position holding the valve member 33 open and permitting fluid to flow through the valve 10a, and out through the conduit 12. As the pressure in the working system builds up, increasing force is exerted against the right-hand face of the piston 42. When the force exerted against the piston 42 by the fluid pressure in the chamber 32 exceeds the pressure exerted by the spring 43, the piston 42 is moved to the left, lowering the valve member 33 onto the seat 31, and terminating the flow of fluid through the valve 10a. Due to the inertia of the piston 42, it will tend to move somewhat beyond the position of balance between the forces exerted by the spring 43 and the pressure in the chamber 32. Such additional movement is permitted by virtue of the sliding action of the valve stem 34 within the piston 42.

Actually, due to the sluggishness of the piston 42, the valve member 33 will be closed at a point at which the pressure in the working chamber 32 is very slightly greater than the corresponding force of the spring 43 at exactly the point of closure, of the valve member 33. Thus, the piston 42 will assume a position of rest at which the face of the piston is slightly spaced from the flange, as illustrated in Figure 3. The result of this is that when the working pressure in the chamber 32 again drops below normal the piston starts to move to the right and is already in motion before it engages the flange 41.

Thus, the static friction of the piston 42 against the inner wall of the housing 25, is overcome before the load of "cracking" the valve 31—33 is added to the forces resisting the movement of the piston. Also, the inertia of the piston 42 and the valve stem 34 moving to the right give an added initial impetus to the opening force applied to the member 33.

The foregoing discussion applies only to the pressure reducing function of the valve 10. For a more detailed description of the presently preferred embodiment of the valve, reference should now be had to Figure 5. The presently preferred valve 10 is housed in a generally rectangular body 50 having three parallel longitudinal bores therein, and having inlet and outlet passages 51 and 52, respectively, which are threaded to receive the conduits 13 and 12, respectively, as shown in Figure 4.

Of the three longitudinal bores, the uppermost contains a reverse flow check valve assembly, indicated generally by the reference character 53; the central bore contains the pressure reducing elements, indicated generally by the reference character 54; and the lowermost bore contains a relief valve assembly, indicated generally by the character 55. The three valve assemblies 53, 54 and 55 are installed into the valve 50 by insertion from the right-hand end of the body, as viewed in Figure 5, and are secured therein by transverse pins 56 pressed into the body.

Referring first to the pressure reducing valve assembly 54 contained in the central bore, it will be seen that the elements are essentially equivalent to those described in connection with the simplified valve 10a. Fluid introduced through the passageway 51 passes through a porous filter sleeve 57 into a high pressure chamber 58. From the high pressure chamber 58 fluid may, under certain conditions, pass through a valve port 59 into a working pressure chamber 60. A valve member 61 moved by a shouldered valve stem 62 controls the passage of fluid through the port 59.

The valve member 61 has a relatively loose fit with the valve stem 62 whereby the member 61 may rock slightly to seat itself perfectly on the valve port or seat 59. An internal sealing gasket 63 is provided within the valve member 61 to prevent the escape of fluid around the valve stem 62. The valve member 61, as in the previous embodiment, is urged to the left by a compression spring 64.

Surrounding the valve stem 62 at the right-hand end thereof is a sleeve 65, having a diameter slightly less than the opening of the valve port 59, the sleeve 65 being secured to the valve stem 62 by a transverse pin 66. An internal sealing ring 67 prevents fluid from escaping around the stem 62 through the sleeve 65. The entire valve assembly, including the valve port or seat 59, the movable member 61, the stem 62, the porous filter sleeve 57, the compression spring 64, and the sleeve 65, is held into the central bore by means of a retaining bushing 68, and a cover plate 69, held in place by the aforementioned transverse pins 56.

The valve stem 62 is formed with three longitudinal flats 70 whereby when the valve stem is moved to the right to open the movable member 61, fluid may pass through the opening of the port 59 into the working pressure chamber 60. As in the previous embodiment, motion of the valve stem 62 to open the valve member 61 is effected by a piston 71 urged to the right by a calibrated compression spring 72, and to the left by fluid pressure in the chamber 60. The piston 71 in its motion to the right, as just described, engages a flange 73 on the valve stem 62 whereby to move the latter member to the right to open the valve port 59 when the pressure in the working pressure chamber 60 falls below a predetermined value. As previously, a portion 74 of the valve stem 62 projects through the piston 71, having sliding engagement therein, and being sealed by a sealing ring 75. The piston 71 is installed from the left into the central bore of the valve body 50 and is retained therein by a locking ring 76 secured by a screw 77.

The compression spring is also installed from the left and is anchored in the body 50 against the piston 71 by an adjustable threaded plug 77 which may be screwed into the body 50 to adjust the initial pressure of the spring 72 against the piston 71 and thereby adjust to a predetermined working pressure in the chamber 60. The plug 77 is locked in place by a lock nut 78, and is provided with a pair of spanner wrench holes 79 which also serve as breather openings.

The operation of the reducer valve assembly 54 is essentially the same as that described in connection with the previous embodiment. When the pressure in the working pressure chamber 60 falls below the predetermined value, the piston 71 moves to the right, engaging the flange 73 and moving the valve stem 72 to the right, whereupon the shoulder on the stem 62 adjacent the port 59, engages the movable valve member 61 and opens the same to allow additional high pressure fluid to flow into the chamber 60. The diameter of the stem portion 74 is slightly larger than the port opening 59 which, in turn, is slightly larger than the external diameter of the sleeve 65 whereby the static pressures tend to hold the valve member 61 in closed position.

In the uppermost bore is installed the reverse flow check valve assembly 53, which comprises a valve seat 80, a movable valve member 81, normally engaged therewith, a valve-closing spring 82 urging the valve member 81 against the seat 80, all these parts being retained by a retaining bushing 83 secured in place by the aforesaid transverse pins 56. As can be seen in Figure 6, the retaining bushing 83 is cut away to form four longitudinal splines 84 whereby fluid may escape around the valve member 81 when the same is lifted from the valve seat 80. Fluid escaping around the movable valve member 81 may return to the inlet passage 51, as can be seen in Figure 5.

A diagonally drilled passageway 85 connects the central bore with the uppermost bore whereby the fluid chamber 60 is in communication with an upper valve chamber 86 adjacent the valve seat 80.

The purpose of the reverse flow check valve 53 is to return fluid from the portion of the working system connected to the valve 10 at the passageway 52 in the event of a drop in the supply pressure in the inlet passage 51 which is normally higher than that in the working pressure chamber 60. The rate of the spring 82 is so calculated that upon the occurrence of a predetermined pressure differential between the pressure in the working chamber 60 and the pressure in the inlet passageway 51, the valve 81 opens, permitting fluid to flow from the chamber 60 through the chamber 86, and the valve assembly 53, back into the normally high pressure system.

In the event that the pressure in the working chamber 60 should rise above a normal predetermined value but still be less than enough to open the valve 81, it is desirable that such excess pressure be relieved. For this purpose, the relief valve assembly 55 is provided in the lowermost bore of the body 50. The relief valve assembly includes elements essentially equivalent to those in the reverse valve 53, the relief valve elements being a seat 90, a movable valve member 91, a compression spring 92, and a retaining bushing 93, held in place by transverse pins 56. As can be seen in Figure 4, a pair of longitudinal grooves 94 are formed in the bushing 93 whereby to permit the escape of fluid when the valve member 91 is lifted from the valve seat 90 by an excess of pressure in the exit passageway 52.

For purposes of describing the operation of the valve 10, let it be assumed that the storage pressure in the reservoir 11 is on the order of 1500 pounds. Let it be assumed further that the desired working pressure in the cylinder 18 is 665 pounds.

The pressure of the spring 72 against the piston 71 is then adjusted by means of the threaded plug 77 until it is such that, with a pressure of 665 pounds in the chamber 60, the stem 62 has been moved to a point just in engagement with the movable valve member 61. Thus, the pressure reducing valve assembly 54 will operate to keep the pressure in the chamber 60 at 665 pounds so long as the storage pressure at the inlet passageway 51 is equal to or exceeds 665 pounds.

Let it be assumed further that it is desired to return fluid from the conduit 12 through the valve 10 whenever the pressure in the conduit 13 drops below 615 pounds. The reverse flow check valve assembly is then adjusted by proper selection of the spring 82 until a pressure differential of 50 pounds (665 minus 615) is required to open the valve member 81. Under such conditions, a drop in pressure in the high pressure line 13 will result in a reverse flow through the valve assembly 53 to supply emergency pressure to such portions of the working system as may be connected to the conduit 15.

Finally, if the pressure in the chamber 60 rises above 665 pounds, it normally cannot escape through either the reverse flow valve assembly 53 or the pressure reducer valve 54 since the pressure in the high pressure chamber 58 is in the neighborhood of 1500 pounds. Such excess pressure in the chamber 60 can escape, however, through the relief valve assembly 55 inasmuch as the compression spring 92 is so selected as to permit opening of the valve member 91 when the pressure thereagainst exceeds 665 pounds.

Thus, it will be seen that through the incorporation of a valve embodying the present invention, a variable high pressure storage system is possible, wherein the working pressure is accurately maintained at a constant value, and wherein emergency pressure may be made available in the event of a failure of the storage reservoir.

While the valves shown and described herein are fully capable of achieving the objects and providing the advantages hereinbefore stated, it will be realized that they are capable of considerable modification without departing from the spirit of the invention. For this reason, I do not mean to be limited to the forms shown and described, but rather to the scope of the appended claims.

I claim:

1. For use in a fluid pressure servo system of the type having a high pressure supply system including a storage reservoir and a pressure actuated motor system adapted to operate at a working pressure less than that of said reservoir, a fluid pressure regulator comprising: body means having a first fluid connection for communication with said reservoir and a second fluid connection for communication with said motor system; means forming first and second passages having fluid connection adapted to be connected between said reservoir connection and said motor system connection; a member in said first passage adapted to control flow of fluid therethrough; pressure sensitive means responsive to said working pressure at said motor system connection and connected to move said member and arranged to positively open said first passage when said working pressure falls below a predetermined value; check valve means in said second passage adapted to prevent fluid flow therethrough from said reservoir connection to said motor system connection; yielding means adapted and positioned to urge said check means to closed position, said yielding means being further adapted to yield to opening movement of said check valve means upon a predetermined excess of pressure at said motor system connection over that at said supply reservoir connection; and pressure relief means in said regulator communicated with the fluid connection for said motor system adapted to release fluid from said motor system when the pressure thereof exceeds said working pressure.

2. A pressure regulator comprising: a body having therein formed normally high and low pressure fluid connections and at least two passages interconnecting said connections; a valve member in a first of said passages responsive to pressure at said high pressure connection to normally close said first passage; pressure sensitive means in said body responsive to fluid pressure at said low pressure connection and adapted to move said member to open said first passage when said fluid pressure at said second connection falls below a predetermined working value; and check valve means in said second passage independent of said valve member and adapted to normally close said second passage whenever the pressure at said high pressure connection exceeds that at said low pressure connection, said check valve means including yielding means adapted and positioned to urge said check means to closed position, said yielding means being further adapted to yield to opening movement of said check means upon a predetermined excess of pressure at said second connection over that at said first connection.

3. The construction set forth in claim 2 further characterized by having fluid release means in said body communicated with said second connection and adapted to release fluid from said body whenever the fluid pressure at said second connection exceeds by a given amount said predetermined working value.

4. In a fluid control valve, the combination of: a body having formed therein, inlet and outlet fluid connections and a passage therebetween; an annular fluid port in said passage positioned to divide the same into two intercommunicated chambers upstream and downstream from said port; a movable annular valve member in said upstream chamber adapted to contact said annular valve port to close said passage; a first compression spring in said upstream chamber positioned and adapted to urge said valve member in a closing direction; a circular opening in said upstream chamber coaxial with said port and having a diameter slightly less than that of said port; means forming a relatively large cylindrical opening in said downstream chamber; a piston sealably and slidably positioned in said cylindrical opening for movement toward and away from said port; a second compression spring engaged with said piston and adapted to urge the same toward said port; an adjustable abutment for said second spring positioned and adapted to adjust the pressure of said spring against said piston; a circular opening in said piston coaxial with said port and having a diameter slightly larger than that of said port; a valve stem having cylindrical end portions sealably and slidably positioned in said upstream chamber opening and in said piston opening with its ends exposed to external pressure adjacent said openings, said valve stem having an abutment formed thereon adjacent said piston whereby inward motion of said piston engages said abutment and moves said stem inwardly toward said port, and said stem having shoulder means formed therein adjacent said port, said shoulder means being adapted to engage said valve member upon movement of said stem in said inward direction to open said valve member whereby decrease of pressure in said downstream chamber to a predetermined value permits said second compression spring to move said piston inwardly to engage said abutment and move said stem to open said valve member and increase in said downstream chamber pressure moves said piston outwardly in opposition to said compression spring to permit said first compression spring to close said valve member and whereby said piston may move outwardly after closure of said valve member.

5. The construction set forth in claim 4 further characterized by having formed in said body, a second passage communicating said upstream and downstream chambers, said second passage having a check valve means therein, positioned and adapted to normally prevent flow from said upstream chamber to said downstream chamber and said check valve means including a spring urging the same into closed position, said spring being adapted to yield upon a predetermined excess of pressure in said downstream chamber over that of said upstream chamber whereby to open said check valve and permit counterflow of fluid through said second passage upon failure of fluid pressure in said upstream chamber.

6. The construction set forth in claim 5 further characterized by having a spring-closed pressure relief valve in said downstream chamber adapted to open and release fluid from said downstream chamber upon the pressure therein exceeding a predetermined value.

7. In a fluid control valve, the combination of: a body having a fluid passage therethrough; an intermediate valve port of predetermined area formed in said passage and dividing the same into upstream and downstream chambers; an opening in the wall of each of said chambers, axially aligned with said port, the opening in said upstream chamber being slightly smaller than the area of said port, and the area of the opening in said downstream chamber being slightly larger than said port; a valve stem sealably and slidably carried in said openings and extending through said port, said stem having a portion reduced in cross-section intermediate its ends to leave an annular opening through said port around said stem; an annular valve member sealably and slidably carried by said stem and said reduced portion and positioned to close said port opening; yielding means in said upstream chamber engaged with said annular valve member to urge the same in a closing direction abutments on said stem upstream and downstream from said valve member to limit the movement thereon of said stem whereby axial movement of said stem in an upstream direction lifts said valve member to open said port, and axial movement of said stem in a downstream direction urges said valve member against said port, and whereby fluid pressure in either of said chambers urges said valve member in a closing direction a movable portion in the wall of said downstream chamber externally exposed to atmospheric pressure and positioned adjacent said stem; and a lost motion connection between said wall portion and stem to move the latter to lift said valve member upon pressure reduction responsive movement of said wall portion.

8. In a fluid control valve, the combination of: a body having a fluid passage therethrough; an intermediate valve port of predetermined area formed in said passage and dividing the same into upstream and downstream chambers; an opening in the wall of each of said chambers, axially aligned with said port, the opening in said upstream chamber being slightly smaller than the area of said port, and the area of the opening in said downstream chamber being slightly larger than said port; a valve stem sealably and slidably carried in said openings and extending through said port, said stem having a portion reduced in cross-section intermediate its ends to leave an annular opening through said port around said stem; an annular valve member sealably and slidably carried by said stem on said reduced portion and positioned to close said port opening; abutments on said stem upstream and downstream from said valve member to limit the movement thereof on said stem whereby axial movement of said stem in an upstream direction lifts said valve member to open said port, and axial movement of said stem in a downstream direction urges said valve member against said port, and whereby fluid pressure in either of said chambers urges said valve member in a closing direction; a valve spring in said upstream chamber engaged with said valve member to urge the same in a closing direction a movable portion in the wall of said downstream chamber externally exposed to atmospheric pressure and positioned adjacent said stem; and a lost motion connection between said wall portion and stem to move the latter to lift said valve member upon pressure reduction responsive movement of said wall portion.

9. In a fluid control valve, the combination of: a body having a fluid passage therethrough; an intermediate valve port of predetermined area formed in said passage and dividing the same into upstream and downstream chambers; an opening in the wall of each of said chambers extending to the exterior of said body, said openings and port being axially aligned; the opening in said upstream chamber being slightly smaller than the area of said port, and the area of the opening in said downstream chamber being slightly larger than the area of said port actuating means including a movable portion in the wall of said downstream chamber externally exposed to atmospheric pressure and adjoining said opening therein and a valve stem extending through said openings and port and sealably and slidably carried in said openings, said stem having an abutment thereon engageable by said wall portion and a portion reduced in cross-section at said port to leave an annular opening therethrough around said stem; an annular valve member slidably and sealably carried on said reduced portion positioned to close said port opening; and a second abutment on said stem positioned to engage said valve member and lift the same upon axial movement of said stem toward said upstream chamber; and yielding means in said upstream chamber engaged with said annular valve member to urge the same in a closing direction.

10. The construction set forth in claim 9 further characterized by having formed in said body, a second passage communicating said upstream and downstream chambers, said second passage having a check valve means therein, positioned and adapted to normally prevent flow from said upstream chamber to said downstream chamber and said check valve means including a spring urging the same into closed position, said spring being adapted to yield upon a predetermined excess of pressure in said downstream chamber over that of said upstream chamber whereby to open said check valve and permit counterflow of fluid through said second passage upon failure of fluid pressure in said upstream chamber.

11. In a fluid control valve, the combination of: a body having formed therein an inlet, an outlet, and a passage therebetween; a fluid port of predetermined area in said passage to divide the same into two intercommunicated chambers upstream and downstream from said port, said upstream chamber having an opening of predetermined area formed therein in addition to said inlet; a movable valve member in said upstream chamber having a central bore and a surrounding portion adapted to cooperate with said port to close said passage; a movable portion in the wall of said downstream chamber externally exposed to atmospheric pressure and having an opening of predetermined area formed therein in axial alignment with said port and said upstream chamber opening; a valve operating member sealably and axially slidably positioned in said openings and extending through said bore, said member having a first abutment adapted to engage said valve member whereby the latter, when closed, is acted on by force equal to $a-b+c-d$, where $a$ is equal to said port area times the pressure in said upstream chamber, $b$ is equal to the area of said upstream chamber opening times said upstream chamber pressure, $c$ is equal to the area of said opening in said wall portion times the downstream chamber pressure, and $d$ is equal to said port area times said downstream chamber pressure; and abutment means on said operating member engageable by said wall portion upon pressure responsive movement thereof whereby to open said valve member upon occurrence of a predetermined pressure in said downstream chamber.

LEE E. BALDWIN.

References Cited in the file of this patent

UNITED STATES PATENTS

| Number | Name | Date |
|---|---|---|
| 913,853 | Rowntree | Mar. 2, 1909 |
| 1,131,341 | Dieter | Mar. 9, 1915 |
| 1,650,150 | Nelson | Nov. 22, 1927 |
| 1,731,145 | MacMillion | Oct. 8, 1929 |
| 1,836,740 | Albers | Dec. 15, 1931 |
| 2,005,445 | Wiedhofft | June 18, 1935 |
| 2,189,221 | Paine | Feb. 5, 1940 |
| 2,232,038 | Stone | Feb. 18, 1941 |
| 2,272,243 | Jacobson | Feb. 10, 1942 |
| 2,314,672 | Veenschoten | Mar. 23, 1943 |
| 2,316,445 | Marshall | Apr. 13, 1943 |
| 2,365,650 | Shaw | Dec. 19, 1944 |
| 2,442,635 | Bennett | June 1, 1948 |
| 2,524,264 | Knox | Oct. 3, 1950 |

FOREIGN PATENTS

| Number | Country | Date |
|---|---|---|
| 178,207 | France | Aug. 27, 1886 |
| 785,116 | France | May 13, 1935 |